United States Patent [19]
Rothammer

[11] Patent Number: 5,727,772
[45] Date of Patent: Mar. 17, 1998

[54] REMOTE VALVE CONTROL DEVICE

[76] Inventor: Frederick R. Rothammer, RR #1, Box 4665, Wolcott, Vt. 05680

[21] Appl. No.: 515,493

[22] Filed: Aug. 15, 1995

[51] Int. Cl.⁶ .................................................. F16K 31/53
[52] U.S. Cl. .......................... 251/229; 70/63; 70/70; 251/249.5
[58] Field of Search ....................... 251/229, 248, 251/249.5; 70/63, 70, 89.13, 89.14

[56] References Cited

U.S. PATENT DOCUMENTS

| | | | |
|---|---|---|---|
| 867,605 | 10/1907 | Rothe | 251/248 |
| 1,145,757 | 7/1915 | Dugan | 251/248 |
| 1,343,609 | 6/1920 | Bassett | 251/248 |
| 1,506,433 | 8/1924 | Knauf | 251/248 |
| 1,523,122 | 1/1925 | Hellmann | 251/248 |
| 1,527,442 | 2/1925 | Rudolph | 251/248 |
| 1,570,700 | 1/1926 | Murakami | 251/248 |
| 1,756,552 | 4/1930 | Heitz | 251/248 |
| 1,838,506 | 12/1931 | Tinnerman | 251/248 |
| 3,164,359 | 1/1965 | Dyer et al. | 251/68 |
| 3,430,916 | 3/1969 | Raymond, Jr. | 251/71 |
| 3,582,038 | 6/1971 | Harbonn et al. | 251/71 |
| 3,765,660 | 10/1973 | Taylor et al. | 148/146 |
| 3,785,396 | 1/1974 | Morris et al. | 137/359 |
| 3,802,390 | 4/1974 | Blair et al. | 119/16 |
| 4,607,658 | 8/1986 | Fraser et al. | 137/393 |
| 4,653,535 | 3/1987 | Bergmann | 137/636.2 |
| 5,230,365 | 7/1993 | Woltz et al. | 137/607 |
| 5,307,837 | 5/1994 | Woltz et al. | 137/607 |

*Primary Examiner*—George L. Walton
*Attorney, Agent, or Firm*—Calfee, Halter & Griswold LLP

[57] ABSTRACT

A remote valve control device is provided, comprising first and second perpendicularly oriented shafts connected by a linkage comprising either a universal joint or a pair of bevel gears. The linkage converts rotational movement of the first shaft about a first axis to rotational movement of the second shaft about a second axis. A valve attachment, connected to the end of the second shaft opposite the linkage, converts rotational movement of the second shaft about the second axis to rotational movement about a third axis of rotation generally parallel to the second axis, so that rotation of the first shaft about the first axis of rotation rotates the valve attachment about the third axis of rotation to open and close the valve. A handle attached to the end of the first shaft opposite the linkage provides means to manually control the operation of the remote valve control device. The device, which is generally L-shaped, may be mounted alongside both of a pair of perpendicular walls, thereby providing easily accessible remote control of the valve which might otherwise be inaccessible.

18 Claims, 3 Drawing Sheets

REMOTE VALVE CONTROL DEVICE

FIELD OF THE INVENTION

The present invention relates generally to remote valve control devices and more particularly to a remote valve control for a water supply line which provides easy access to a valve which would otherwise be inaccessible.

BACKGROUND OF THE INVENTION

Valves for controlling fluid flow, such as water supply lines in houses, condominiums or apartment buildings, are often positioned so as to prevent easy access thereto. For example, valves for water supply lines for home appliances, such as a dishwasher or a washing machine, are often located behind the appliance and thus are not easily accessed once the appliance is installed in front of the valve. This is especially true in the case of stackable washer/dryer units. However, on occasion it is desirable to shut off the water supply to an appliance without removing the appliance from its installed position, for example if the appliance user anticipates an extended period away from the residence in which the appliance is installed. Thus, if the user desires to shut off the water supply to the appliance without removing the appliance from its installed position, he or she must reach behind the appliance to operate the valve, a sometimes troublesome and inconvenient task.

An alternative to a rear-mounted valve/supply line for an appliance is a side-mounted valve/supply line. Such installations provide easier access to the user, but do so at the expense of requiring additional space on the side of the appliance. Often, appliance space is at a premium in modern construction, especially when space-saving compact appliances such as dishwashers, washing machines, or stackable washer/dryer combinations are installed in closets, alcoves, or other spatially limited locations. In such installations, sidewall space is especially limited. Moreover, such side mounted valve/supply lines and the hoses connected thereto are unsightly and unattractive to the appliance user.

Accordingly, there is a need for a valve control mechanism which permits easy control of a valve located behind an appliance, and which takes up little valuable space. Thus, it is an object of the present invention to provide a valve control mechanism for opening and closing a valve, such as a water supply valve, from an easily accessible location which is remote from that of the less easily accessible valve. It is a further object of the invention to provide such a mechanism which is manually operable, which requires little space, and which is aesthetically pleasing.

SUMMARY OF THE INVENTION

A remote valve control device is provided for controlling the operation of a valve attached to water supply lines used for supplying water to an appliance. The remote valve control device is attached along the walls of a compartment into which the appliance is installed. The remote valve control device allows the valve, which is located behind the appliance, to be controlled from an easily accessible location alongside the appliance.

The remote valve control device includes a first shaft, a second shaft, a linkage connecting the first and second shafts, and a U-shaped valve attachment connecting the second shaft to the valve. The first shaft is rotatable about a first axis of rotation, and the second shaft is rotatable about a second axis of rotation perpendicularly oriented to the first axis of rotation. The linkage converts rotational movement of the first shaft about the first axis to rotational movement of the second shaft about the second axis.

The U-shaped valve attachment connects the end of the second shaft opposite the linkage to the valve. The U-shaped valve attachment includes a first portion attached to the second shaft, a second portion attached to the valve, and a third portion connecting the first and second portions. The second portion is screwed into the valve, replacing a single lever valve control which actuates the valve. The second portion pivots about a third axis defined by the internal valve mechanism to open and close the valve.

To operate the remote valve control device, a handle fixedly attached to the first shaft is rotated along the first axis. The linkage transforms rotation of the first shaft along the first axis into rotational movement of the second shaft along the second axis. The U-shaped valve attachment transforms the rotation of the second shaft along this second axis to rotation of the second portion of the U-shaped valve attachment about the third axis to open and close the valve.

DETAILED DESCRIPTION OF THE PREFERRED EMBODIMENT

Figure 1:
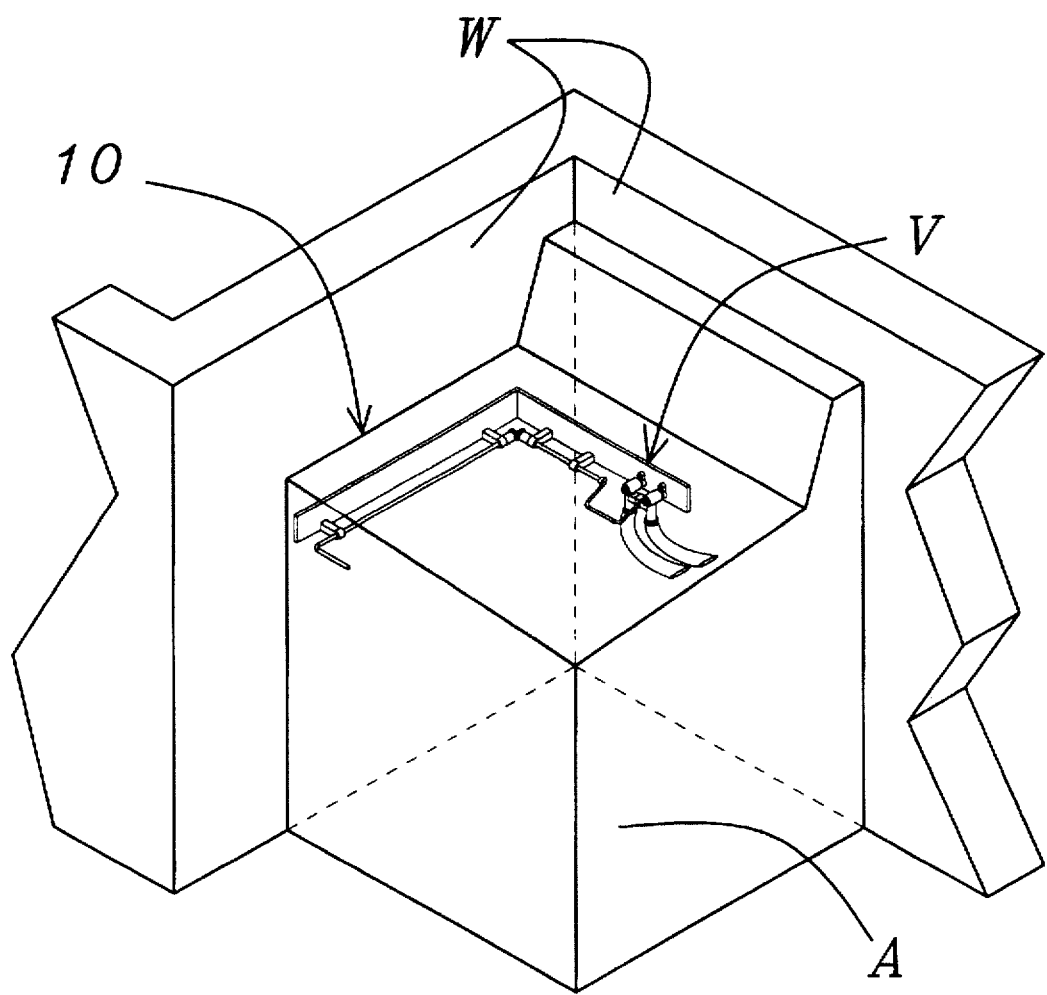
FIG. 1 shows a remote valve control device constructed according to the principles of the present invention and installed in an intended installation.

As shown in FIG. 1, a remote valve control device 10 is installed along the walls W of a compartment and is connected to a valve V attached to water supply lines extending from one of the walls and used for supplying water to an appliance A. The compartment is, for example, a closet or alcove or other spatially limited location, and the appliance is, for example, a dishwasher, a washing machine, or a stackable washer/dryer unit. The remote valve control device 10 allows the valve V, which is located behind the appliance A, to be controlled from an easily accessible location alongside the appliance.

Figure 2:
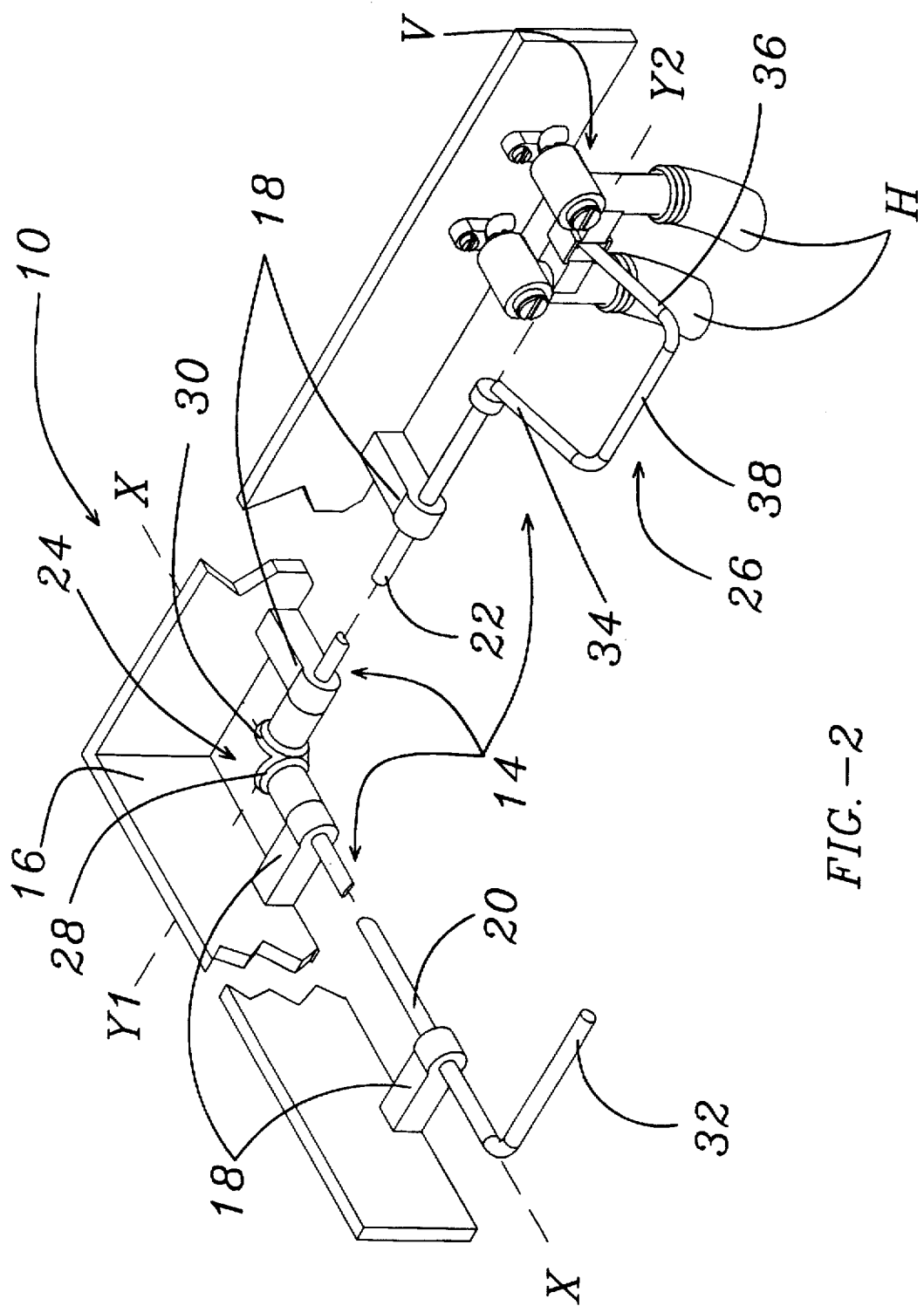
FIG. 2 is a detailed perspective view of the remote valve control device of FIG. 1, shown in an off or closed position.
Figure 3:
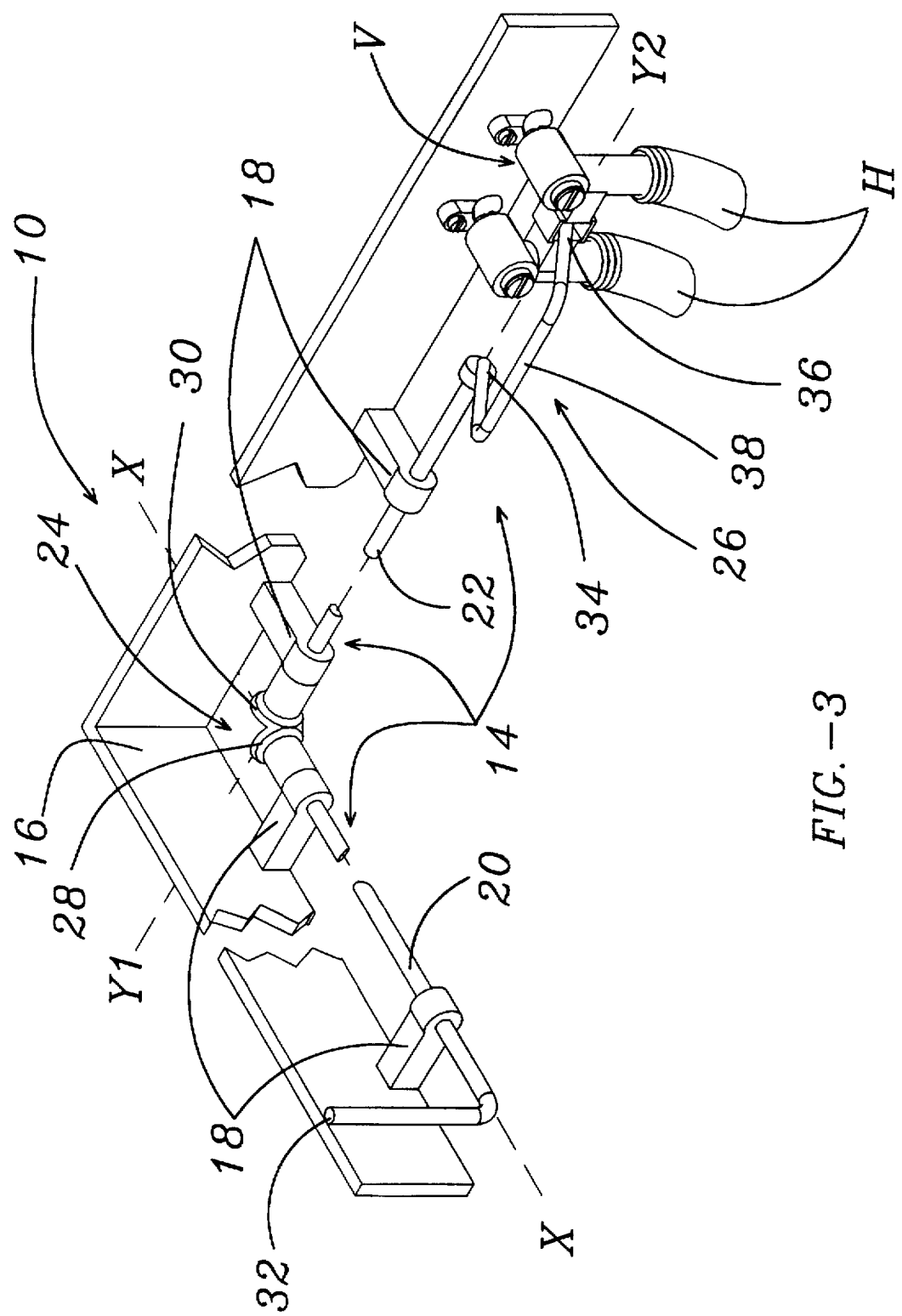
FIG. 3 is a detailed perspective view of the remote valve control device of FIG. 1, shown in an on or open position.

FIGS. 2 and 3 show more detailed views of the remote valve control device 10 of FIG. 1. As shown in the Figures, the valve V is shown as part of the device 10. In this embodiment of the invention, the valve is attached to existing water supply lines (not shown) extending from the wall W and connectable to the valve. However, it is contemplated that the invention may encompass only a remote valve control device 10 which does not include valve V, but which is connectable to an existing valve V with minor modification to the valve.

In the embodiment shown in FIGS. 2 and 3, the remote valve control device 10 comprises a manually operated control mechanism 14, the valve V, a bracket 16 for mounting the control mechanism to a compartment wall, and a plurality of support arms 18 for connecting the control mechanism to the bracket 16. The bracket may be made of steel or any other suitable material, and is perpendicularly L-shaped to match the wall configuration to which it is to be attached. The support arms 18 are constructed of a similar material. Although not shown in FIGS. 2 and 3, the support arms may be made of a resilient material and provided with slots into which the control mechanism 14 may be snap-fit so that the control mechanism is removably detachable from the bracket without requiring any additional fasteners. The support arms 18 may be provided with friction-resistant surfaces for receiving the components of the control mechanism for rotation within.

The valve V is a dual supply line, single lever control valve. This type of valve is a widely available, standard plumbing item. The valve V is attachable to existing water supply lines (typically hot and cold). A pair of hoses H connect the valve V to the appliance A.

The valve control mechanism 14 comprises a first shaft 20, a second shaft 22, a linkage 24 connecting the first and second shafts, and a U-shaped valve attachment 26. The first shaft 20 is rotatable about a first axis of rotation X, and the second shaft is rotatable about a second axis of rotation Y1. The first and second shafts are preferably unitary steel rods, which may be provided with decorative covers, if desired. The first and second axes of rotation, X and Y1, respectively, are disposed generally perpendicular to each other.

The linkage 24 converts rotational movement of the first shaft 20 about the first axis X to rotational movement of the second shaft 22 about the second axis Y1. In the disclosed embodiment, the linkage 24 comprises a pair of bevel gears 28 and 30 fixedly attached to ends of the first and second shafts 20 and 22, respectively. A handle 32, connected to (or made integral with) the end of the first shaft 20 opposite bevel gear 28, is used to manually rotate the first shaft from a first (closed) position as shown in FIG. 2 to a second (open) position as shown in FIG. 3. The handle may be provided with a decorative cover, if desired.

As is known in the gear art, each of the bevel gears 28 and 30 are provided with teeth which engage or mesh with teeth on the other gear so as to enable conversion of rotational movement of bevel gear 28 about axis X into rotational movement of bevel gear 30 about axis Y1. Other types of connections for transforming rotational movement of the first 20 into rotational movement of the second shaft 22 are contemplated. For example, a universal joint may be used in place of the pair of bevel gears.

The U-shaped valve attachment 26 connects the end of the second shaft 22 opposite bevel gear 30 to the valve V. The U-shaped valve attachment 26 includes a first portion 34 attached to the second shaft, a second portion 36 attached to the valve V, and a third portion 38 connecting the first and second portions 34 and 36. The valve shown in FIGS. 2 and 3 is modified slightly from the form in which it may be purchased as a stock plumbing item. Specifically, the valve V is provided in its unmodified form with a single lever (not shown) for actuating the valve which corresponds both physically and operatively to the third portion 38 of the U-shaped valve attachment 26. The lever pivots about an axis Y2 defined by the internal valve mechanism to open and close the valve. This lever is removed from the valve by unscrewing it from the body of the valve. The U-shaped valve attachment 26 is screwed into the valve body at this location in place of the original single lever.

In the embodiment of the invention which does not include valve V, but which is connectable to an existing valve, the existing valve may be modified in the same manner as disclosed above, namely, by removing (unscrewing) the single valve lever and installing (screwing) the U-shaped valve attachment 26 into the valve body at the same location. The U-shaped valve attachment may then be fixedly attached to the second shaft 22. Alternatively, if the support arms 18 are provided with the slots into which the first and second shafts 20 and 22 may be snap-fit, as described above, the U-shaped valve attachment 26 may be pre-attached to the rest of the control mechanism so that the U-shaped valve attachment may be screwed into the valve body with the rest of the control mechanism attached thereto. The first and second shafts may then be snapped into place into the support arms.

During operation of the control mechanism 14, the handle 32 is rotated from the closed position of FIG. 2 to the open position of FIG. 3, thereby rotating the first shaft 20 about axis X. The linkage 24 converts this rotational movement to rotational movement of the second shaft 22 along axis Y1. The U-shaped valve attachment 26 converts the rotational movement of the second shaft about axis Y1 to rotational movement of the second portion 36 of the U-shaped valve attachment about axis Y2. Axis Y2 is generally parallel to axis Y1 and may be either collinear with axis Y1, or may be offset with respect thereto.

Installation of the above-described remote valve control device is relatively simple. If an existing valve V is provided, the existing valve lever is removed and replaced by the U-shaped valve attachment. In embodiments of the invention which include the valve V, the valve need only be connected to an existing pair of water supply lines. Various components of the device 10, including the first and second shafts 20 and 22 and the bracket 16, may be fabricated in common lengths to accommodate a variety of sizes of appliances. In addition, these components may be adjusted, for example in length, during installation in the field.

Accordingly, the preferred embodiment of a remote valve control device has been described. With the foregoing description in mind, however, it is understood that this description is made only by way of example, that the invention is not limited to the particular embodiments described herein, and that various rearrangements, modifications, and substitutions may be implemented without departing from the true scope of the invention as defined by the following claims and their equivalents.

I claim:

1. A remote valve control device, comprising:

a first shaft rotatable about a first axis of rotation, said first shaft having first and second ends;

a second shaft rotatable about a second axis of rotation which is generally perpendicular to said first axis of rotation, said second shaft having first and second ends;

a coupling device attached to said first and second shafts for converting rotational movement of said first shaft about said first axis to rotational movement of said second shaft about said second axis, said coupling device attached at a first end to said second end of said first shaft, and at a second end to said first end of said second shaft; and a valve attachment connected to said second end of said second shaft for attachment to a valve to be controlled, said valve attachment having a section which is perpendicular to said second shaft whereby rotation of said second shaft about said second axis rotates said valve attachment about a third axis of rotation generally aligned with said second axis; whereby rotation of said first shaft about said first axis of rotation rotates said second shaft about said second axis which rotates said valve attachment about said third axis of rotation to open and close the valve.

2. The remote valve control device of claim 1, wherein said third axis of rotation is generally parallel to with said second axis of rotation but offset with respect thereto.

3. The remote valve control device of claim 2, wherein said valve attachment includes a lever portion connecting said second end of said second shaft to the valve.

4. The remote valve control device of claim 1, wherein said second shaft is a unitary member directly coupling said second end of said coupling device to said valve attachment.

5. The remote valve control device of claim 4, wherein said coupling device comprises a universal joint.

6. The remote valve control device of claim 4, wherein said coupling device comprises a pair of mating bevel gears.

7. The remote valve control device of claim 4, wherein said first and second control shafts are comprised of steel rods.

8. The remote valve control device of claim 7, wherein said first and second control shafts are provided with mounting brackets for mounting said remote valve control device alongside both of a pair of perpendicular walls, said brackets having friction-resistant surface portions for receiving said control shafts for rotation thereagainst.

9. The remote valve control device of claim 7, further comprising a handle attached to said first end of said first shaft for manually controlling the operation of said remote valve control device.

10. A valve control mechanism for opening and closing a valve on a water supply line from a location remote from the valve, said valve control mechanism comprising:

a first shaft manually rotatable about a first axis of rotation, said first shaft having first and second ends;

a second shaft rotatable about a second axis of rotation which is generally perpendicular to said first axis of rotation, said second shaft having first and second ends;

a coupling device attached to said first and second shafts for converting manually-imparted rotational movement of said first shaft about said first axis to rotational movement of said second shaft about said second axis, said coupling device attached at a first end to said second end of said first shaft, and at a second end to said first end of said second shaft; and a valve attachment having a section which extends perpendicularly from said second end of said second shaft and attached to a valve to be opened and closed, said perpendicular section of said valve attachment converting rotational movement of said second shaft about said second axis to rotational movement of the valve about a third axis of rotation generally aligned with to said second axis to open and close the valve.

11. The valve control mechanism of claim 10, wherein said third axis of rotation is generally parallel to with said second axis of rotation but offset with respect thereto.

12. The valve control mechanism of claim 11, wherein said valve attachment includes a lever portion connecting said second end of said second shaft to the valve.

13. The valve control mechanism of claim 10, wherein said second shaft is a unitary member directly coupling said second end of said coupling device to said valve attachment.

14. The valve control mechanism of claim 13, wherein said coupling device comprises a universal joint.

15. The valve control mechanism of claim 14, wherein said coupling device comprises a pair of mating bevel gears.

16. The valve control mechanism of claim 14, wherein said first and second control shafts are comprised of steel rods.

17. The valve control mechanism of claim 16, wherein said valve control mechanism is generally L-shaped, and said first and second control shafts are provided with mounting brackets for mounting said valve control mechanism alongside both of a pair of perpendicular walls, said brackets having friction-resistant surface portions for receiving said control shafts for rotation thereagainst.

18. A combination valve and remote valve actuating mechanism, comprising:

a valve connectable to a water supply; and a remote valve actuating mechanism for opening and closing said valve, said mechanism comprising:

a first shaft manually rotatable about a first axis of rotation, said first shaft having first and second ends;

a second shaft rotatable about a second axis of rotation which is generally perpendicular to said first axis of rotation, said second shaft having first and second ends;

a coupling device attached to said first and second shafts for converting manually-imparted rotational movement of said first shaft about said first axis to rotational movement of said second shaft about said second axis, said coupling device attached at a first end to said second end of said first shaft, and at a second end to said first end of said second shaft; and a valve attachment perpendicularly extending from said second end of said second shaft for attachment to said valve, said valve attachment converting rotational movement of said second shaft about said second axis to rotational movement about a third axis of rotation generally parallel to said second axis to open and close said valve.

\* \* \* \* \*